United States Patent [19]

Umehara

[11] Patent Number: 5,201,284
[45] Date of Patent: Apr. 13, 1993

[54] OVERHEAT DETECTING APPARATUS FOR ENGINE

[75] Inventor: Kazuhiro Umehara, Shizuoka, Japan

[73] Assignee: Suzuki Motor Corporation, Shizuoka, Japan

[21] Appl. No.: 884,063

[22] Filed: May 15, 1992

Related U.S. Application Data

[62] Division of Ser. No. 720,740, Jun. 25, 1991, Pat. No. 5,133,303.

[30] Foreign Application Priority Data

Jun. 29, 1990 [JP] Japan ................... 2-172316
Jun. 29, 1990 [JP] Japan ................... 2-172317

[51] Int. Cl.$^5$ ............................................. F01P 5/14
[52] U.S. Cl. .................................. 123/41.15; 123/421
[58] Field of Search ........................ 123/41.15, 421

[56] References Cited

U.S. PATENT DOCUMENTS

| | | | |
|---|---|---|---|
| 3,680,533 | 8/1972 | Soberski | 123/41.15 |
| 3,775,745 | 11/1973 | Kelley | 123/41.15 |
| 3,871,341 | 3/1975 | Kalogerson et al. | 123/421 |
| 3,896,913 | 7/1975 | Maruoka et al. | 123/421 |
| 4,549,504 | 10/1985 | Gaines et al. | 123/41.15 |
| 4,755,790 | 7/1988 | Umehara | 340/53 |
| 4,790,280 | 12/1988 | Umehara et al. | 123/422 |
| 4,887,068 | 12/1989 | Umehara | 340/450.3 |
| 4,930,475 | 6/1990 | Daikoku et al. | 123/339 |
| 4,940,965 | 7/1990 | Umehara | 340/460 |
| 4,971,583 | 11/1990 | Umehara | 440/2 |
| 5,016,006 | 5/1991 | Umehara | 440/2 |
| 5,020,497 | 6/1991 | Umehara et al. | 123/423 |

FOREIGN PATENT DOCUMENTS

| | | |
|---|---|---|
| 3012809 | 10/1981 | Fed. Rep. of Germany ...... 123/421 |
| 61-16274 | 1/1986 | Japan . |
| 62-75076 | 4/1987 | Japan . |

Primary Examiner—Noah P. Kamen
Attorney, Agent, or Firm—Flynn, Thiel, Boutell & Tanis

[57] ABSTRACT

A method and apparatus for detecting engine overheating and controlling engine ignition timing utilizes a single temperature sensor. The temperature sensor is positioned adjacent a cylinder head of an engine. A rate of engine temperature increase is calculated based on engine temperature information produced by the temperature sensor, and engine speed is regulated based on the calculated rate of engine temperature increase. Ignition timing is also controlled in response to the engine temperature information produced by the temperature sensor, and the engine speed is regulated to a predetermined speed value whenever the engine temperature exceeds a predetermined temperature value.

4 Claims, 9 Drawing Sheets $N_1$ ... MINIMUM ENGINE SPEED FOR JUDGING TEMPERATURE RISING RATE $t_1$ ... TEMPERATURE FOR CANCELING A WARNING WHEN JUDGMENT IS MADE AS TEMPERATURE RISING RATE BEING ABNORMAL AND A WARNING IS ISSUED $t_4$ ... TEMPERATURE ABNORMALITY WARNING TEMPERATURE $t_2$ ... TEMPERATURE FOR CANCELING TEMPERATURE ABNORMALITY WARNING

- $N_1$ ··· MINIMUM ENGINE SPEED FOR JUDGING TEMPERATURE RISING RATE
- $t_1$ ··· TEMPERATURE FOR CANCELING A WARNING WHEN JUDGMENT IS MADE AS TEMPERATURE RISING RATE BEING ABNORMAL AND A WARNING IS ISSUED
- $t_4$ ··· TEMPERATURE ABNORMALITY WARNING TEMPERATURE
- $t_2$ ··· TEMPERATURE FOR CANCELING TEMPERATURE ABNORMALITY WARNING

T - CYLINDER TEMPERATURE (°C)

A - CYLINDER TEMPERATURE RISING VALUE (°C) PER UNIT TIME

IT₁ ⋯ IGNITION TIMING AT THE TROLLING TIME
IT₂ ⋯ IGNITION TIMING AT THE START SPARK ADVANCE TIME

OVERHEAT DETECTING APPARATUS FOR ENGINE

This is a division of Ser. No. 07/720,740, filed Jun. 25, 1991 now U.S. Pat. No. 5,133,303.

FIELD OF THE INVENTION

This invention relates to an overheat detecting apparatus for an engine, and particularly to an overheat detecting apparatus for an engine which uses a temperature sensor and is suitably used for a marine engine such as an outboard motor.

BACKGROUND OF THE INVENTION

Generally, marine engines, etc., are air-cooled engines, in which there is adopted a system to draw up water by pump and discharge the water after the water has been circulated within the engine. When the engine is overheated because of an occurrence of something abnormal to the cooling water in conventional systems, a temperature sensor attached to a cylinder head or in the neighborhood thereof outputs a signal when it detects a preset temperature and activates an audible buzzer, and furthermore activates the regulation of engine speed or the like.

On the other hand, when attention is paid to the abnormality of cooling water, there is a conventional system wherein a pressure sensor or a cooling water detecting sensor is attached likewise to the cylinder head or a water channel in the neighborhood thereof in order to detect the fact that the cooling water flow has stopped or is reduced and to warn the operator of the abnormality of cooling water (in the case of a cooling water) by buzzing a buzzer and regulating the engine speed.

The most troublesome problem inherent in the system having the temperature sensor attached to the cylinder head or the neighborhood thereof is determining what the preset temperature should be. Since the detected temperature is a temperature increasing owing to abnormality of the engine, if the preset temperature is too high, the alarm is too late. On the contrary, if the preset temperature is too low, the alarm is issued even within a normal temperature range. Therefore, experiments to determine this preset temperature are very troublesome. Furthermore, careful attention must also be paid to irregularity of sensors and heat conduction.

An object of the present invention is, in view of the above-mentioned inconveniences inherent in the prior art, to provide an overheat detecting apparatus for an engine which is capable of rapidly detecting an occurrence of an overheated state of an engine particularly by catching the rate of abrupt temperature increase occurable at one stage of engine overheating and effectively preventing the same.

The present invention includes a temperature sensor attached to a cylinder head or the neighborhood thereof, alarm means for issuing an alarm to the outside when said temperature sensor detects an overheating state of the engine, and a main control unit for inputting an output signal from said temperature sensor and actuating said alarm means to indicate that it is necessary to regulate the engine speed.

The main control unit includes a temperature increase rate calculating function for calculating a temperature increase rate of the engine in accordance with an output signal from said temperature sensor, and an alarm control function for actuating said alarm means and regulating the engine speed if such calculated temperature increase rate of the engine becomes a predetermined value or more when the engine speed and engine temperature are within respective predetermined ranges of engine speed and engine temperature.

Recent marine engines, especially engines of outboard motors, employ a starting spark advance method for automatically advancing the ignition timing from the maximum spark delaying time in order to enhance the starting performance. This method employs not only such a function as to spark advance the ignition timing under a certain condition but also such a function for controlling the spark advance time or ignition timing by engine temperature. On the other hand, such engines generally include an overheat warning function for detecting, in the case engine is overheated due to inferior cooling water pumping or the like, rising engine temperature and giving a warning to the operator by generating a buzzer sound, lighting a lamp or the like.

A general spark advance mechanism for outboard motors is constructed such that a stator of a magneto is cooperatively worked with the opening degree of a throttle so as to be mechanically slided. However, there has been employed recently another method in which a throttle sensor is mounted on a throttle shaft of a carburetor, and signals of the opening degree of this sensor are input into an ignition circuit to obtain an ignition timing in correspondence with the opening degree of the throttle.

Furthermore, since a very low speed and smooth rotation called "trolling rotation" is required for the outboard motor, the ignition timing of the totally closed time of the throttle, in many cases, is considerably delayed from the top dead center for the purpose of lowering the exploding pressure. However, since the combustion speed is slow at the staring time, if the ignition timing is left as delayed, the starting performance is inefficient and it is necessary to spark advance close to 10° before the upper dead center piston position.

In view of the above, the engines of the throttle sensor spark advance type employ, in many cases, such a function as to automatically spark advance at the starting time. In these engines, the duration of spark advance time is changed by a temperature sensor signal from a temperature sensor mounted in the vicinity of the cylinder head, or the ignition timing is steppingly changed.

On the other hand, the above-mentioned overheat warning temperature sensor is separately exclusively employed and likewise mounted in the vicinity of the cylinder head.

However, in the above-mentioned conventional systems, the starting spark advance controlling temperature sensor and the overheat warning temperature sensor are, as a matter of course, independent and separate from each other so as to be independently separately employed. For this reason, the layout of mounting these sensors becomes complicated. Furthermore, since the installing places of these sensors are different, the associated coefficient of thermal conductivity is also different and the test for setting a working temperature is troublesome. Moreover, since two sensors are required, the cost becomes high. In addition, since signals are to be input into two sensor systems, the circuit construction becomes complicated and the cost becomes high.

Another object of the present invention is to provide an engine ignition timing control apparatus which is capable of obviating the inconveniences of the prior art, simplifying the overall construction especially by concentrating the construction of the temperature sensor circuit into one system, and lowering the cost of the overall apparatus without lowering the efficiency.

An engine ignition timing control apparatus of the present invention includes a temperature sensor disposed on or in the vicinity of a cylinder head, warning means for issuing a warning to the outside when the temperature sensor detects an overheating state of the engine, and a main control portion for inputting output signals from the temperature sensor, regulating the increase of engine speed, and driving said warning means in accordance with necessity. The main control portion further includes a starting time ignition timing control function for normally inputting output signals from the temperature sensor and controlling the spark advancement at the starting time of the engine on the basis of engine temperature information transmitted from said temperature sensor.

DETAILED DESCRIPTION

One embodiment of the present invention will be described with reference to FIGS. 1 through 6.

Figure 1:
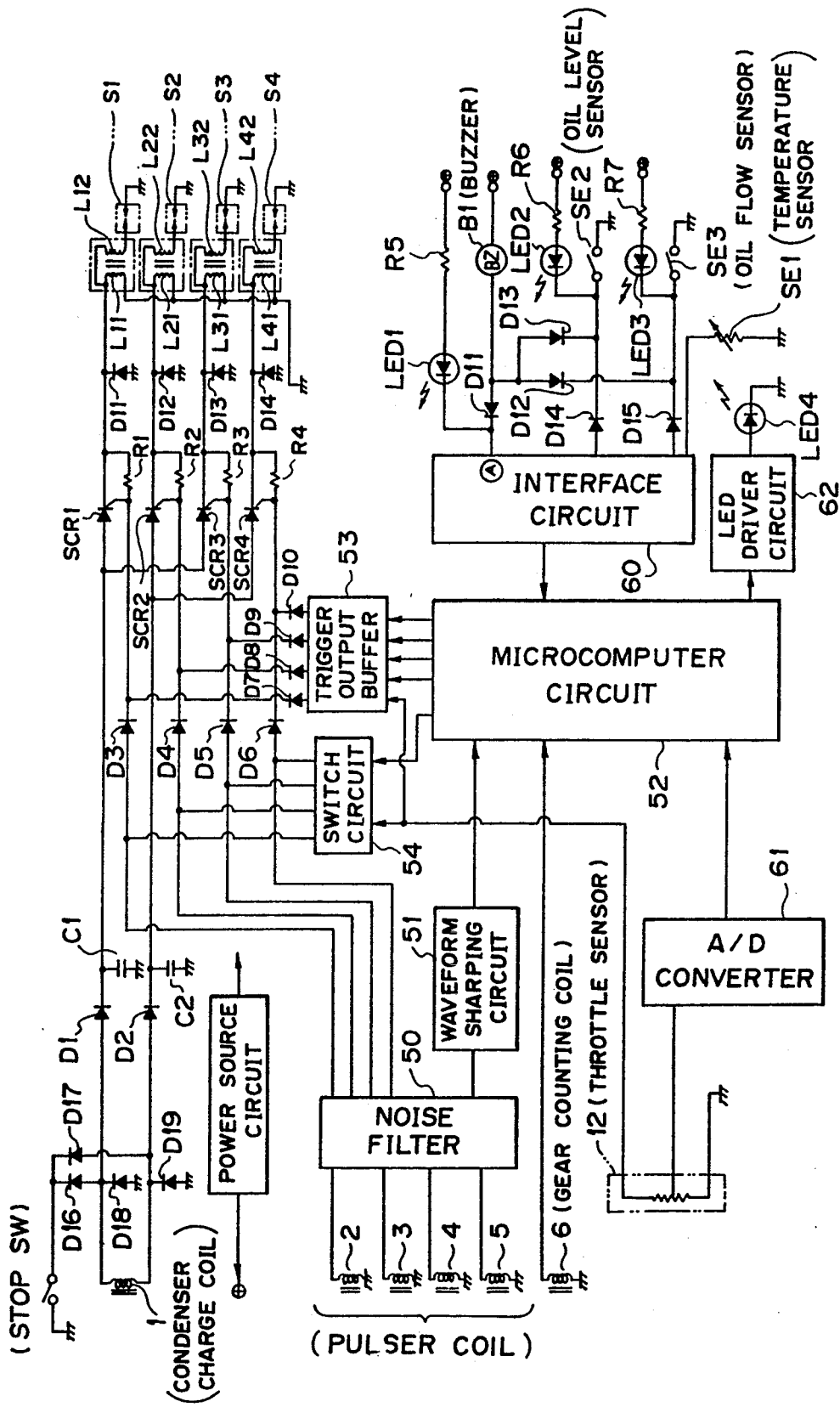
FIG. 1 is a schematic diagram showing one embodiment of the present invention.

The construction of an entire ignition apparatus incorporating the present invention is shown in FIG. 1. A system for practicing the function of the present invention comprises a magneto serving as a power source portion of an ignition system, a control unit including a circuit for performing various kinds of control in accordance with the power and a signal received from the magneto, and various kinds of sensors, indication lamps, buzzers, etc. all connected to the control unit.

Figure 3:
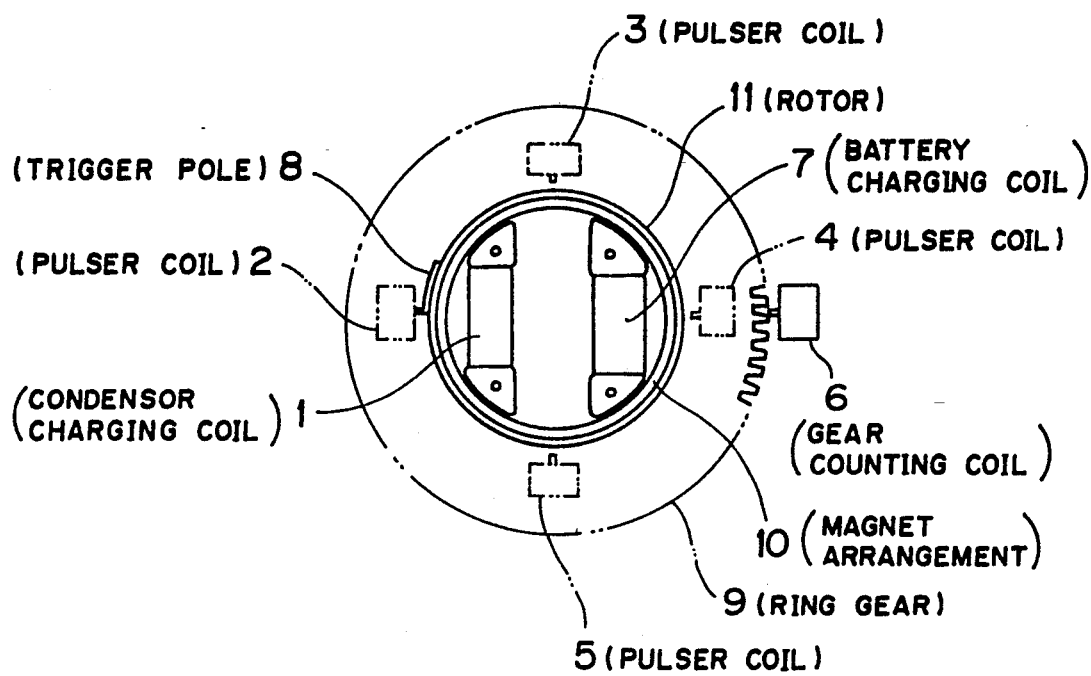
FIG. 3 is an explanatory view showing a magneto to which pulser coils in FIG. 1 are attached.

The magneto comprises, as shown in FIG. 3, a rotor 11, a magnet arrangement 10 attached to the inner side of the rotor 11, and a ring gear 9 attached to the outer side of the rotor 11, the rotor 11 being mounted on an engine crank shaft (not shown). A magnetic trigger pole 8 is mounted on the outer side of the rotor 11, and pulser coils 2 to 5 are arranged radially opposite thereto at circumferential intervals of 90°. Furthermore, a condenser charging coil 1 and a battery charging coil 7 are arranged stationarily within the rotor 11, and a gear counting coil 6 is disposed outside of the ring gear 9.

Next, the control unit shown in FIG. 1 has a battery as a power source and receives the output of the gear count coil 6, a throttle opening degree signal from the throttle sensor 12, an engine temperature signal from an engine temperature sensor SE1, and signals of an oil level sensor SE2, an oil flow sensor SE3, etc. This control unit comprises pulser coils 2 to 5 connected to a noise filter 50, a trigger output buffer 53 actuated by the output of a conventional microcomputer circuit 52 for outputting ignition timing control signals to an ignition circuit portion, a switch circuit 54 for cutting off the outputs of the pulser coils, a waveform shaping circuit 51 for shaping the waveforms of the pulser coils, and an interface circuit 60 for sending and receiving signals between the microcomputer circuit 52 and various kinds of sensors. The numeral 61 denotes an A/D converter, and 62 an LED driver circuit for indicating that regulation of engine speed is occurring.

The ignition circuit portion comprises condensers (i.e., capacitors) C1 and C2 for accumulating electric energy generated by the condenser charging coil 1, and thyristors SCR1 to SCR4 for feeding electric energy accumulated in the condensers C1 and C2 in accordance with signals from the pulser coils 2 to 5.

Next, operation of the whole apparatus will be described.

Figure 2:
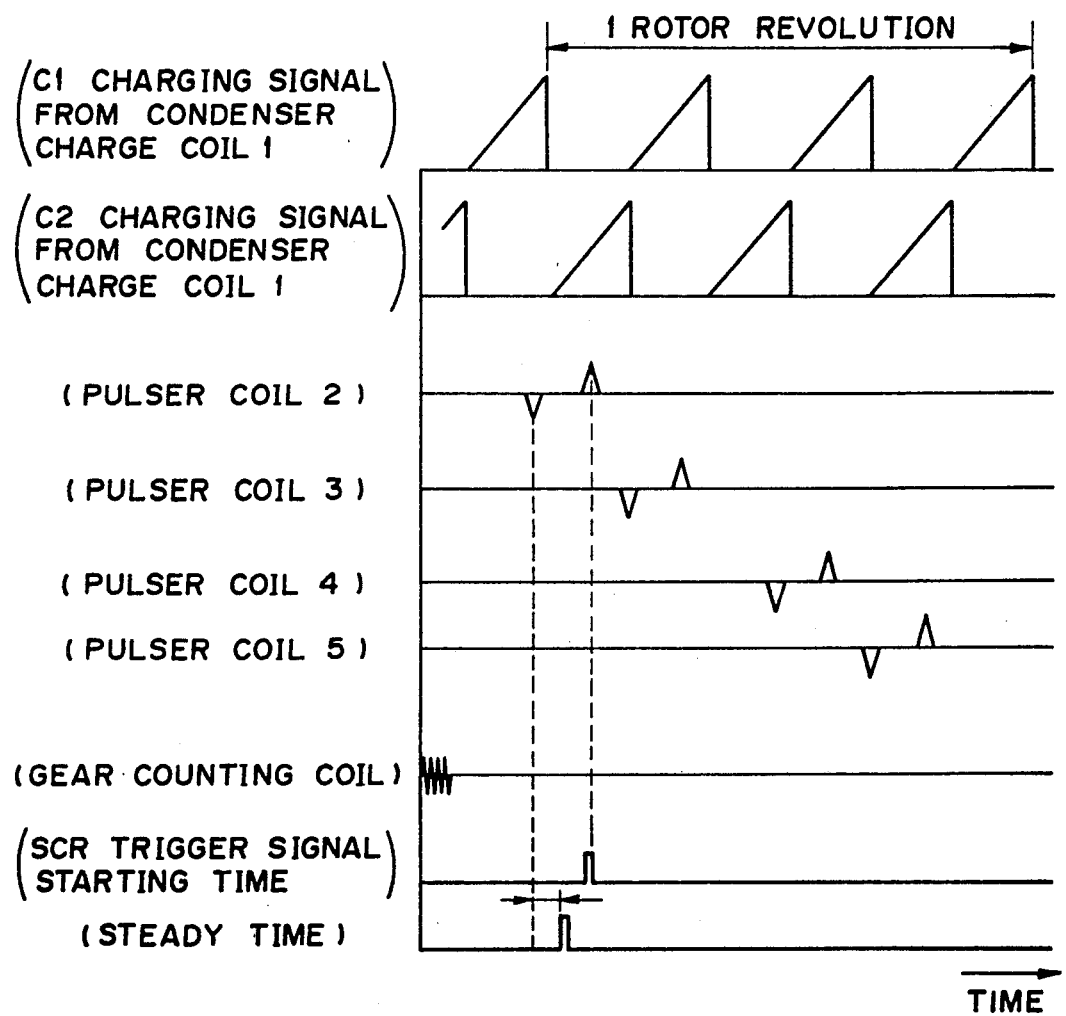
FIG. 2 is a timing diagram showing part of the operation of FIG. 1.

When the engine is started by a starter motor (not shown), a pinion gear (not shown) driven by the starter motor is meshed with the ring gear 9. As a result, the rotor 11 is rotated. Upon rotation of the rotor 11, an electromotive force is generated in the condenser charging coil 1. FIG. 2 shows output waveforms from coil 1 as applied to capacitors C1 and C2 through diodes D1 and D2.

A predetermined amount of electric energy is accumulated in the condenser C1 by the output on the positive (+) side of this condenser charging coil 1, and a predetermined amount of electric energy is accumulated in the condenser C2 by the output on the negative (−) side. When the leading end face of the trigger pole 8 passes opposite to the pulser coil 2 after the condenser C1 has been charged, a negative side of the output waveform of the pulser coil 2 is generated (see FIG. 2) and current flows to the microcomputer circuit 52. In this case, the microcomputer circuit controls so that signals are not output to the trigger output buffer 53 for a few seconds after the start of the engine.

When the rotor 11 is further rotated and the other (trailing) end face of the trigger pole 8 passes opposite to the pulser coil 2, the positive side of the output waveform of the pulser coil 2 is generated (see FIG. 2). By this output, current flows in the following order; pulser coil 2→ noise filter 50→ diode D3→ gate of the thyristor SCR1→ primary L11 of ignition coil, and the thyristor SCR1, which has been in the OFF state, is turned ON. Electric energy from the previously charged condenser C1 is abruptly discharged in the following order; condenser C1→ thyristor SCR1→ primary L11 of the ignition coil. As a result, a high voltage is generated at the secondary side L12 of the ignition coil, and spark plug S1 is sparked to ignite the air-fuel mixture in the combustion chamber. As a result, the engine is started.

Then, other spark plugs are sparked and ignited one after another in the same procedure. This ignition timing (shown as $IT_2$ in FIG. 7) is used during engine starting, and is spark advanced by a few degrees from the ignition timing of a totally closed time (e.g. trolling timing $IT_1$ in FIG. 7). As a result, startability is enhanced.

Figure 4:
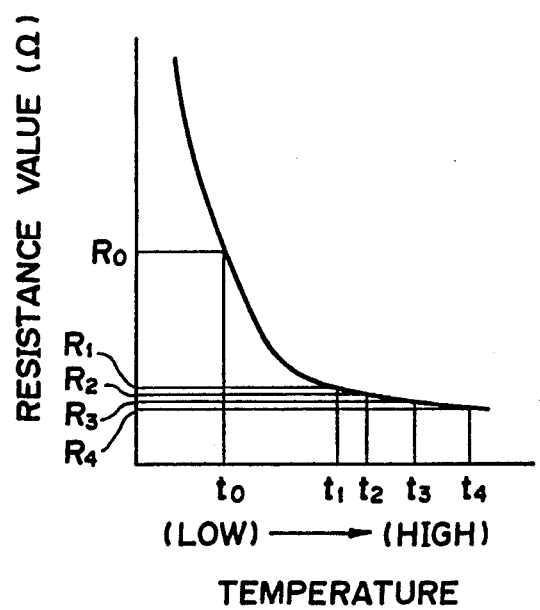
FIG. 4 is a diagram showing the characteristics of a thermistor which is used as a temperature sensor in FIG. 1.

The engine temperature sensor SE1 attached to the cylinder head or in the neighborhood thereof uses a thermistor having a characteristic that a resistance value thereof is decreased as temperature becomes higher as shown in FIG. 4. FIG. 8 shows temperature sensor SE1 mounted on a cylinder head 400. The microcomputer circuit 52 includes a function for normally inputting output signals coming from the temperature sensor SE1 from before the start of the engine and controlling the spark advance at the starting time of the engine based on engine temperature information coming from the temperature sensor SE1. For example, when the temperature of the cylinder is $t_0$ [°C.] or less (see FIG. 4), the microcomputer circuit 52 determines that the resistance value of the thermistor is $R_0$ or more, and the spark advancing time of the starting time may be set to $T_1$ [seconds]. On the other hand, when the temperature of the cylinder is $t_1$ [°C.] or more, the microcomputer circuit 52 determines that the resistance value of the thermistor is $R_1$ or less, and the spark advancing time of the starting time may be set to $T_2$ [seconds]. The relation between $T_1$ and $T_2$ [seconds] is preset to $T_1 > T_2$ (see FIG. 7).

When set time $T_1$ or $T_2$ [seconds] for spark advance ignition timing $IT_2$ of the starting time have passed, the switch circuit 54 is turned on by circuit 52 to bypass the positive side output of the pulser coils 2 to 5. Accordingly, pulser coils 2 to 5 no longer affect the ignition timing at all. The negative sides of the output waveforms of the pulser coils are started by the control of the microcomputer circuit 52, the gear counting coil 6 generates the output shown in FIG. 2, and pulses of this waveform are counted by the microcomputer circuit 52. Then, after counting several pulses of the output of the gear counting coil 6 subsequent to receiving the signal of the throttle sensor 12, it is judged whether signals are to be output from microcomputer circuit 52 to the ignition circuit via the trigger output buffer 53.

The trigger output buffer 53 is controlled by circuit 52 and provides a signal to the gate of the thyristor SCR1 to SCR4 associated with the cylinder for which the ignition time is about to start, and the thyristor is turned on to effect a spark as discussed above. The thyristors of the respective cylinders are turned on from the trigger output buffer at desired times in accordance with a signal from the microcomputer circuit 52 in order to achieve, for example, ignition timing $IT_1$ of FIG. 7.

Figure 7:
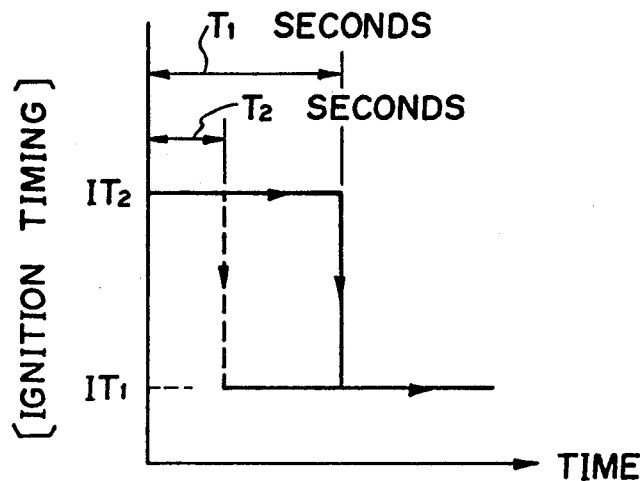
FIG. 7 is an explanatory diagram showing a start spark advance pattern implemented by the apparatus of FIG. 1.
Figure 8:
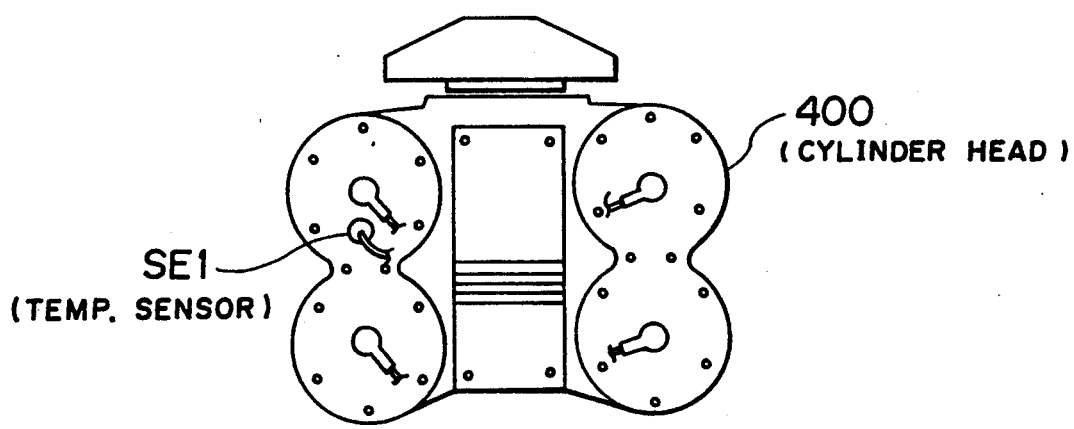
FIG. 8 is an explanatory view showing one example of a mounting position of a temperature sensor of FIG. 1.
Figure 10:
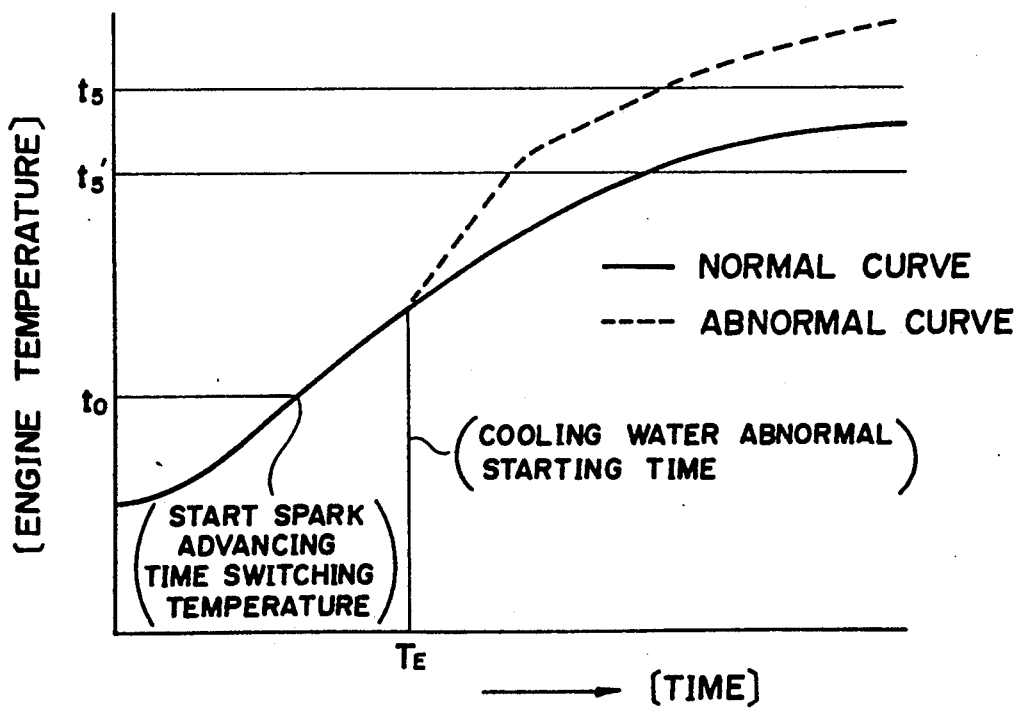
FIG. 10 is an explanatory diagram showing examples of the rising characteristic of engine temperature.
Figure 11:
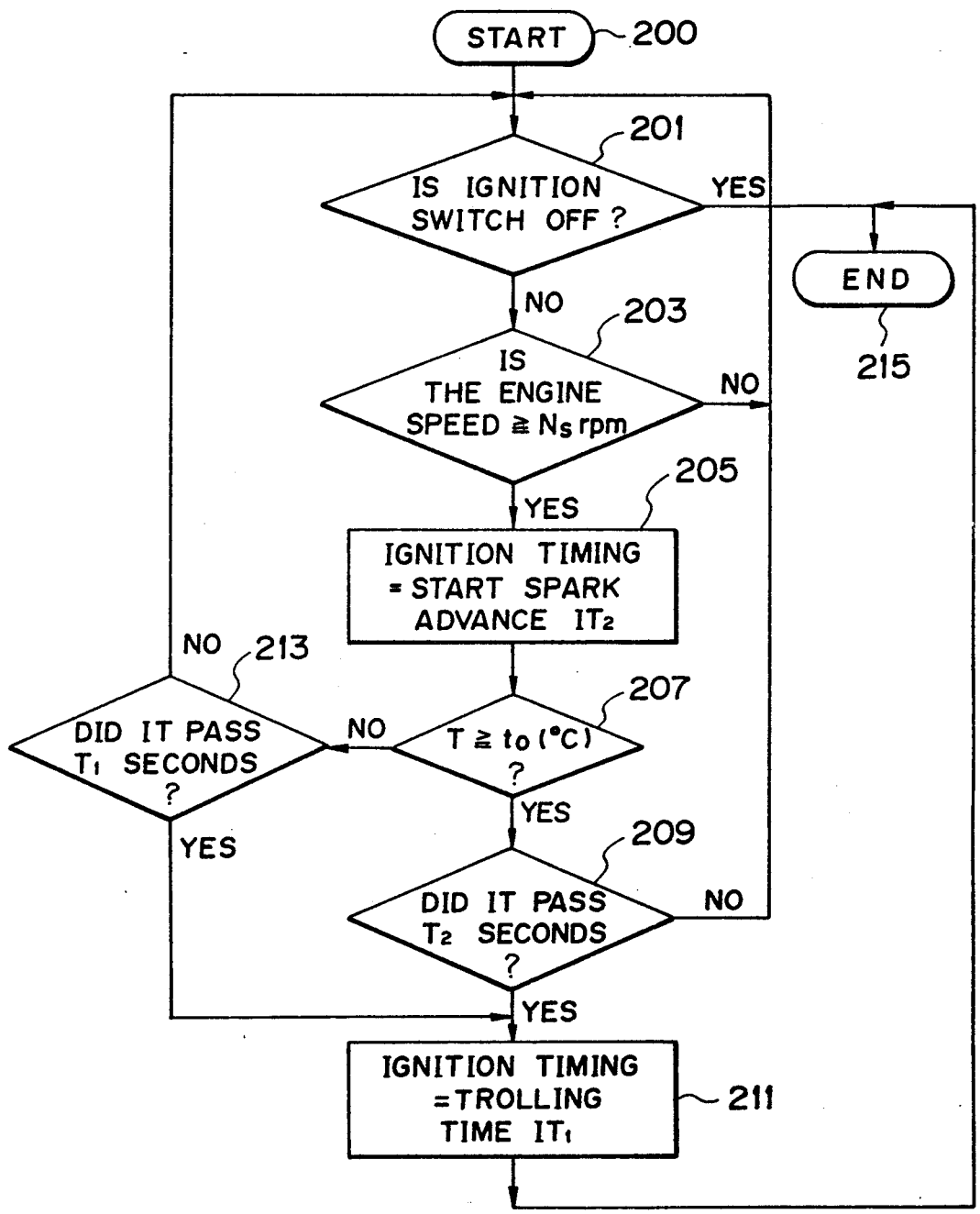
FIG. 11 is a flowchart showing the spark advance control executed by the FIG. 1 embodiment at the starting time of the engine.

FIGS. 10-11 illustrate the control of ignition timing according to FIG. 7.

First, when the temperature of the engine is so low as $t_0$ [°C.] or less at the starting time of the engine, the resistance value of the temperature sensor (thermistor) SE1 is already at least $R_0$ ohms (see FIG. 4). Referring to the flowchart of FIG. 11, the engine is started at this time (201) and it is judged at 203 whether the engine speed at this time is $N_s$ [rpm] or more, $N_s$ being the minimum cranking speed of the starter motor. If the speed is less than $N_s$ [rpm] at 203, it judges as engine stop and control returns to its start point 200. If engine speed is $N_s$ [rpm] or more at 203, it judges that the crank is rotating, and the ignition timing $IT_2$ (see FIG. 7) for spark advance is implemented at 205. However, it is presumed that the throttle valve is totally closed at this time.

Then, it is judged at 207 whether the engine temperature T is $t_0$ [°C.] or more. If the judgment is NO (i.e. $T<t_0$), it is judged at 213 whether $T_1$ seconds have passed. If NO at 213, control returns to the original start point 200. If the judgment at 213 is YES, the starting spark advance timing $IT_2$ is finished, and the trolling ignition timing $IT_1$ (see FIG. 7) is implemented at 211.

When the engine temperature is $t_0$ [°C.] or more at 207, it is judged at 209 whether $T_2$ seconds have passed. If the judgment at 209 is NO, control returns to the start point 200. If the judgment at 209 is YES, the trolling ignition timing IT is implemented at 211.

Next, various kinds of warning operations will be described.

In this embodiment, oil level in an oil tank, an oil flow for checking whether oil is flowing normally, and engine overheating are detected. The microcomputer circuit 52 performs an engine speed control function so as not to permit the engine to execute more than a preset number of revolutions per minute as soon as a buzzer is buzzed and a LED is lighted when an abnormal condition is detected through the checks.

There will be described a case where the oil level has reached a warning level. When oil reaches the warning level, an oil level sensor SE2 is turned on. As a result, current flows in the following order; battery→ buzzer→ diode D13→ oil level sensor SE2→ ground and battery→ resistance R6→ LED 2→ oil level sensor SE2→ and ground. Simultaneously with the buzzing of the buzzer and lighting of the LED 2, current from the interface circuit 60 flows as follows; diode D14→ oil level sensor SE2→ ground. At that time, if the engine is operating at a preset speed or more, regulation of engine speed is activated, and the operator is informed that the oil level has reached the warning level. More specifically, when the regulation of engine speed is actuated, a LED lighting output is output from the LED driver circuit 62 connected to the microcomputer circuit 52 to light up the LED4. As a result, the operator can confirm that the regulation of engine speed is being activated.

An operation similar to the oil level warning operation is performed when the oil flow warning sensor SE3 is turned ON.

Next, the engine overheat warning operation will be described.

Figure 5:
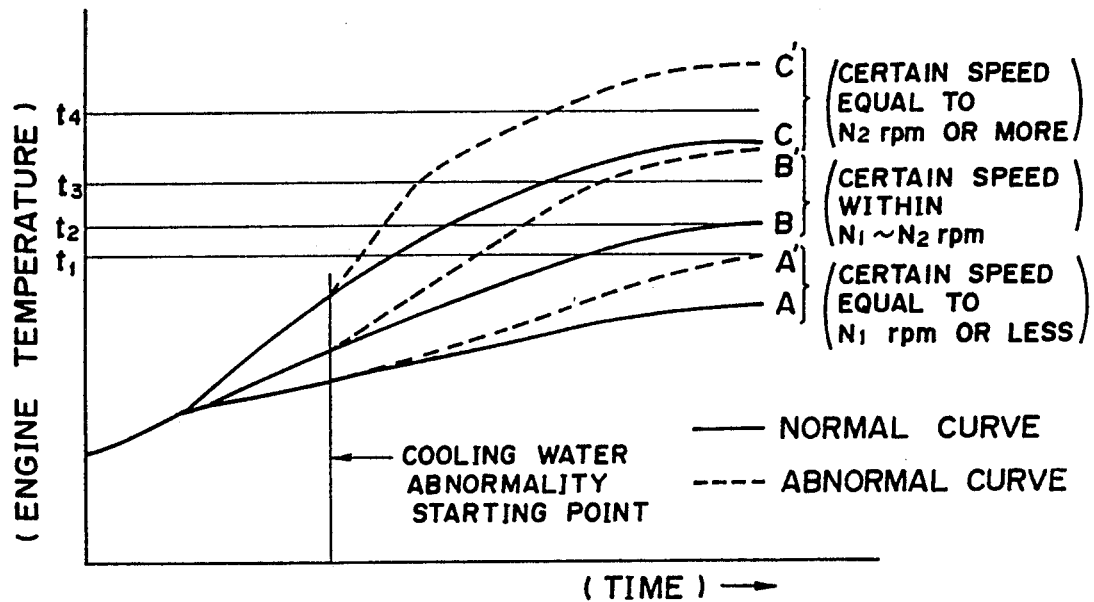
FIG. 5 is a diagram showing examples of rising curves of engine temperature at different engine speeds.

Since the engine temperature sensor SE1 functioning as a sensor for detecting engine overheating also uses the sensor (thermistor) which is used for switching the spark advancing time of the engine starting time previously described, the relation between the temperature and the resistance value is as shown in FIG. 4. On the other hand, the rising characteristics of engine temperature are known as shown in FIG. 5. When the engine speed is $N_1$ or less, curve A indicates a normal temperature curve, and curve A' indicates an abnormal temperature curve. When the engine speed is between $N_1$ and $N_2$ [rpm], curve B is a normal temperature curve, and curve B' is an abnormal temperature curve. When the engine speed is greater than or equal to $N_2$, curves C and C' are normal and abnormal curves, respectively.

Thus, $N_1$ or less is a low speed area, $N_1$-$N_2$ is an intermediate speed area, and above $N_2$ is a high speed area.

Under normal conditions, the temperature rising rate is comparatively large in the early stage and it gradually begins to level off. This tendency appears more significantly at higher engine speeds. On the other hand, when the engine is overheated owing to abnormality of cooling water, a rather abrupt temperature increasing rate is exhibited, as compared with the normal rising rate, and the rate of increase is slowed as the temperature rises. This tendency of the abnormal curves is also more sharply exhibited at higher engine speeds.

Therefore, in detecting overheating, in addition to setting a warning temperature slightly higher than the maximum normal temperature, the present invention also uses the aforementioned differences between the normal and abnormal temperature curves.

Figure 6:
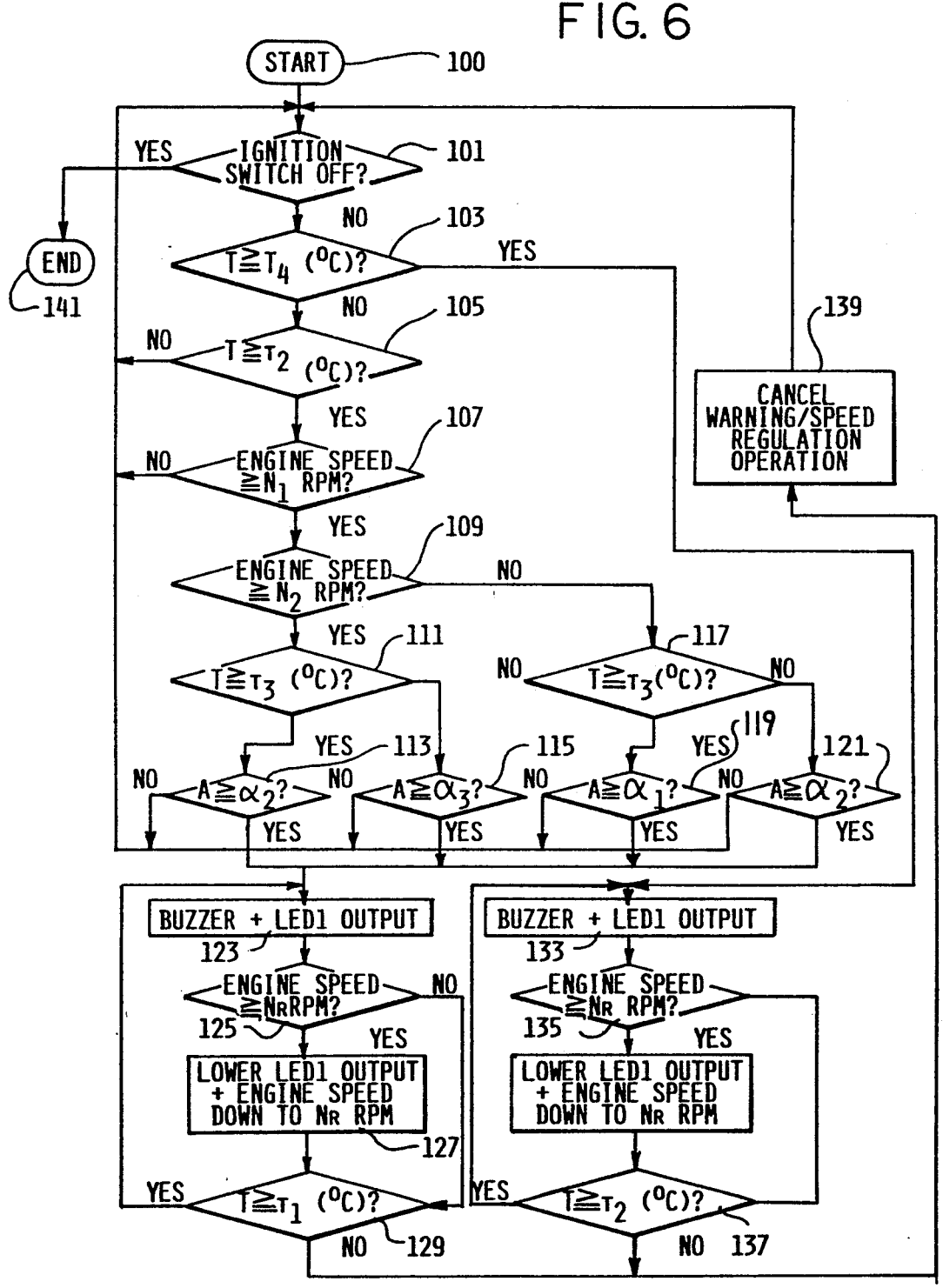
FIG. 6 is an explanatory view showing the overheating detection operation executed by the embodiment of FIG. 1.

A flowchart for detecting overheating will be described hereunder with reference to FIG. 6.

First, the ignition switch is turned ON at 101 and the engine is started. The temperature of the engine is checked, and it is judged at 103 whether the temperature T is equal to or more than $t_4$ [°C.]. If the judgment is that the temperature is equal to $t_4$ [°C.] or more, a warning is issued at 131, but if the temperature is less than $t_4$ [°C.], it is then judged at 105 whether the temperature T is equal to or more than $t_2$ [°C.]. If T is less than $t_2$, then control goes back to the starting time, but if T is equal to or more than $t_2$, then it is checked at 107 whether the engine speed is equal to or more than $N_1$ [rpm]. If engine speed is less than $N_1$ [rpm], then control goes back to the starting time, but if the engine speed is equal to or more than $N_1$ [rpm], then control goes to the next judgment 109.

Temperature $t_4$ [°C.] is an overheat warning temperature which is preset slightly higher than the maximum normal temperature, and $t_2$ [°C.] is a minimum temperature level below which an overheat warning is not actuated (see 105). Similarly, $N_1$ [rpm] is a low speed, and is used as a border speed below which the overheating judgment is not made based on the temperature rising rate because even if the temperature of the engine rises, the engine speed is low. If the engine speed is less than $N_1$ [rpm], overheating is detected only if the engine temperature T is equal to or more than $t_4$ [°C.] (see 107 and 103).

If the engine speed is equal to or more than $N_1$ at 107, it is then judged at 109 whether the engine speed is equal to or more than $N_2$. If engine speed is equal to or more than $N_2$, it is then judged at 111 whether the temperature T of the engine is equal to or more than $t_3$ [°C.]. If T is equal to or more than $t_3$ [°C.], it is then judged at 113 whether the temperature rising rate is equal to or more than $\alpha_2$. If the rate is less than $\alpha_2$, then control goes back to the starting time to repeat the foregoing process because the temperature is normal. If the rate is equal to or more than $\alpha_2$, then control goes to a warning action at 123 because the engine is overheating.

On the other hand, when the temperature T of the engine is less than $t_3$ [°C.] at 111, it is judged at 115 whether the temperature rising rate is equal to or more than $\alpha_3$. If the rate is less than $\alpha_3$, then control goes back to the starting time because the temperature is normal. If the rate is equal to or more than $\alpha_3$, then control goes to the warning action 123 because the engine is overheating.

At the engine speed $N_2$ [rpm], the temperature rising rate after the generation of cooling water abnormality is different than the temperature rising rate at (1) a lower engine speed equal to or more than $N_1$ [rpm] and equal to or less than a certain speed, and (2) a higher engine speed equal to or more than a certain speed. Therefore the preset temperature rising rate for judging overheating is required to be changed, and this $N_2$ [rpm] is a border speed.

If it is desired that the temperature rising rate be further minutely classified for judgment, the engine speed is classified into several ranges, and by applying a temperature rising rate corresponding to the speed range in which the engine speed falls, a judgment as to whether the engine is overheating or not can be performed. Temperature rising rates $\alpha_2$ and $\alpha_3$ are ratios of temperature raised within a certain period of time, (i.e., temperature/ time), and they may be set to proper values in view of normal temperature rising characteristics of the engine. Of course, these rates $\alpha_2$ and $\alpha_3$ are large with respect to the normal temperature rising rate, and values of $\alpha_2$ and $\alpha_3$ which facilitate overheat detection are employed. Thus, the rate values $\alpha_2$ and $\alpha_3$ are defined to be suitably larger than normal rate values, so as to facilitate the detection of overheating.

Because the judgment of overheating is made by computer, more specifically, by microcomputer circuit 52 in the present embodiment, the rate of temperature increase may be sequentially detected several times, and an average of the sequentially detected rate values may then be compared to $\alpha_2$ and $\alpha_3$, as appropriate. Since the temperature rising rate is larger when cooling water temperature becomes abnormal from a low temperature state than when the temperature is high, the relation between $\alpha_1$ and $\alpha_2$ becomes $\alpha_2 < \alpha_3$. That is, because the engine temperature T is lower when rate value $\alpha_3$ is used at 115 than when $\alpha_2$ is used at 113, and because a higher rate of temperature increase is required for a determination of overheating at lower engine temperatures, $\alpha_3$ should be greater than $\alpha_2$.

When the engine speed is less than $N_2$ [rpm] at 109, it is likewise judged at 117 whether the temperature T is equal to or more than $t_3$ [°C.]. If T is equal to or more than $t_3$ [°C.], overheating is detected by checking at 119 whether the temperature rising rate is equal to or more than $\alpha_1$. If the temperature rising rate is less than $\alpha_1$, then control goes back to the starting time because the temperature is normal, and the checking is repeated again. On the other hand, if the temperature rising rate is equal to or more than $\alpha_1$, the engine is overheating and therefore control goes to the warning operation at 123.

Similarly, if the temperature T is less than $t_3$ [°C. ] at 117, it is judged at 121 whether the temperature rising rate is equal to or more than $\alpha_2$. If the rate is less than $\alpha_2$, then control goes back to the starting time because the temperature is normal. However, if the rate is equal to or more than $\alpha_2$, then control goes to the warning operation at 123 because the engine is overheating. The relation between the temperature rising rate values $\alpha_1$ and $\alpha_2$ is $\alpha_1 < \alpha_2$ because of the same reasons mentioned above with respect to $\alpha_2$ and $\alpha_3$, so that $\alpha_1 < \alpha_2 < \alpha_3$.

Next, the warning operation will be described. When it is judged that the engine is overheating, the buzzer buzzes and LED1 is lighted (123 or 131).

The procedure is as follows. Terminal A of the interface circuit 60 of FIG. 1 is brought to a low level from a high level by the microcomputer circuit 52, and current flows as follows; battery→ resistance R5→ LED1→ interface 60, and battery→ buzzer→ diode D11→ interface 60. As a result, the LED1 is lighted and the buzzer buzzes. By this, a warning is given to the operator.

Furthermore, the current engine speed is checked. If the engine speed is equal to or more than a reference speed value $N_R$ [rpm] (125 or 133), the spark leap is extinguished (i.e., ignition timing is adjusted) to lower the engine speed down to $N_R$ [rpm] (127 or 135) to restrain the rising temperature of the engine. In this case, if an attempt is made to increase the engine speed by opening the throttle, the speed is not increased beyond $N_R$ [rpm]. And when this speed regulation is functioning, the microcomputer circuit 52 of FIG. 1 provides a signal to light up the LED 4 through the LED driver circuit 62, thereby to inform the operator about the activation of engine speed regulation.

If the engine speed is already less than $N_R$ [rpm] when overheating is detected, engine speed regulation is not performed.

Once overheating is detected using the rate of temperature increase (see 113, 115, 119 and 121), the above-described warning/speed regulation operation is continued until the engine temperature T is lowered below $t_1$ [°C.] (129) after warning and start of speed regulation. The warning/speed regulation operation is canceled (139) when the engine temperature is lowered below $t_1$ [°C.]. Thereafter, control goes back to the starting time, and the FIG. 6 operation is repeated.

If overheating cannot be detected through the judgments of temperature rising rate at 113, 115, 119 or 121, it can be judged at 103 through the overheat warning temperature $t_4$ [°C.] which has been set slightly higher than the maximum normal temperature. If engine temperature is greater than or equal to $t_4$ [°C.], the buzzer buzzes and the LED1 is lighted for warning (131), and engine speed regulation is actuated at 135 when the engine speed is greater than or equal to $N_R$ (133). If the overheating judgment is made at 103 using $t_4$ [°C.], then the warning/speed regulation procedure is canceled at 139 when the engine temperature is less than $t_2$ (137).

As described in the foregoing, when cooling water abnormality is started, the rising rate of the engine temperature is checked to judge whether there is abnormality or not, in addition to presetting a warning temperature slightly higher than the maximum normal temperature. More rapid and correct judgment can be made compared with the prior art, by judging whether the engine temperature is less than such preset warning temperature. As a result, engine damage can be prevented.

That is, in the above-mentioned embodiment: (1) since the temperature rising rate of the engine after the start of cooling water abnormality is used for judging whether there is abnormality or not, a rapid and correct judgment can be made; (2) the engine temperature rising rate can be minutely classified with respect to engine speed and temperature, and a reference rising rate value can be preset and judged under various conditions; and (3) since a thermistor is used as a temperature sensor, it is inexpensive compared with a bimetallic sensor in which ON-OFF operation is performed, and the thermistor can also be used as a sensor for determining a condition for starting spark advancement.

As described in the foregoing, in the present invention, since the engine temperature rising rate is used for judging whether there is cooling water abnormality or not, cooling water abnormality can be detected rapidly and correctly. As a consequence, the present invention obviates the lack of reliability of the conventional apparatus which was caused by too high or too low preset reference temperature, and can provide a stable and highly reliable overheat detecting apparatus for an engine.

Figure 9:
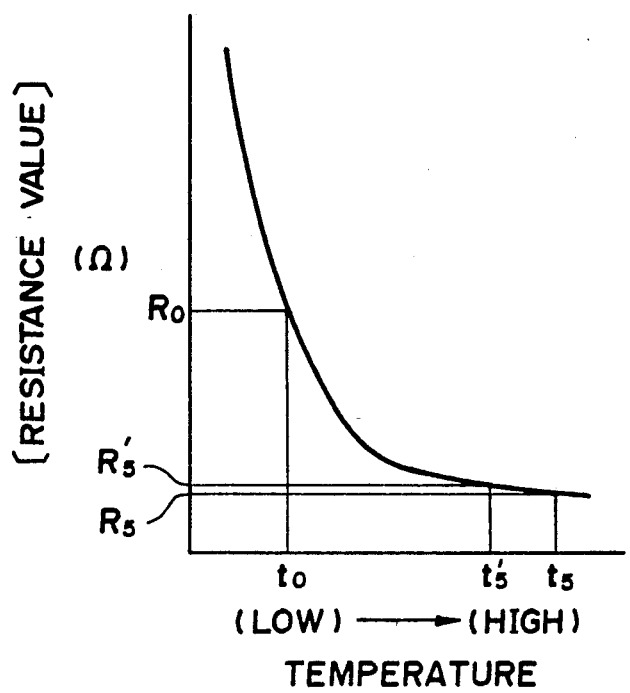
FIG. 9 is a diagram showing the characteristic of a thermistor used in a temperature sensor of FIG. 1.
Figure 12:
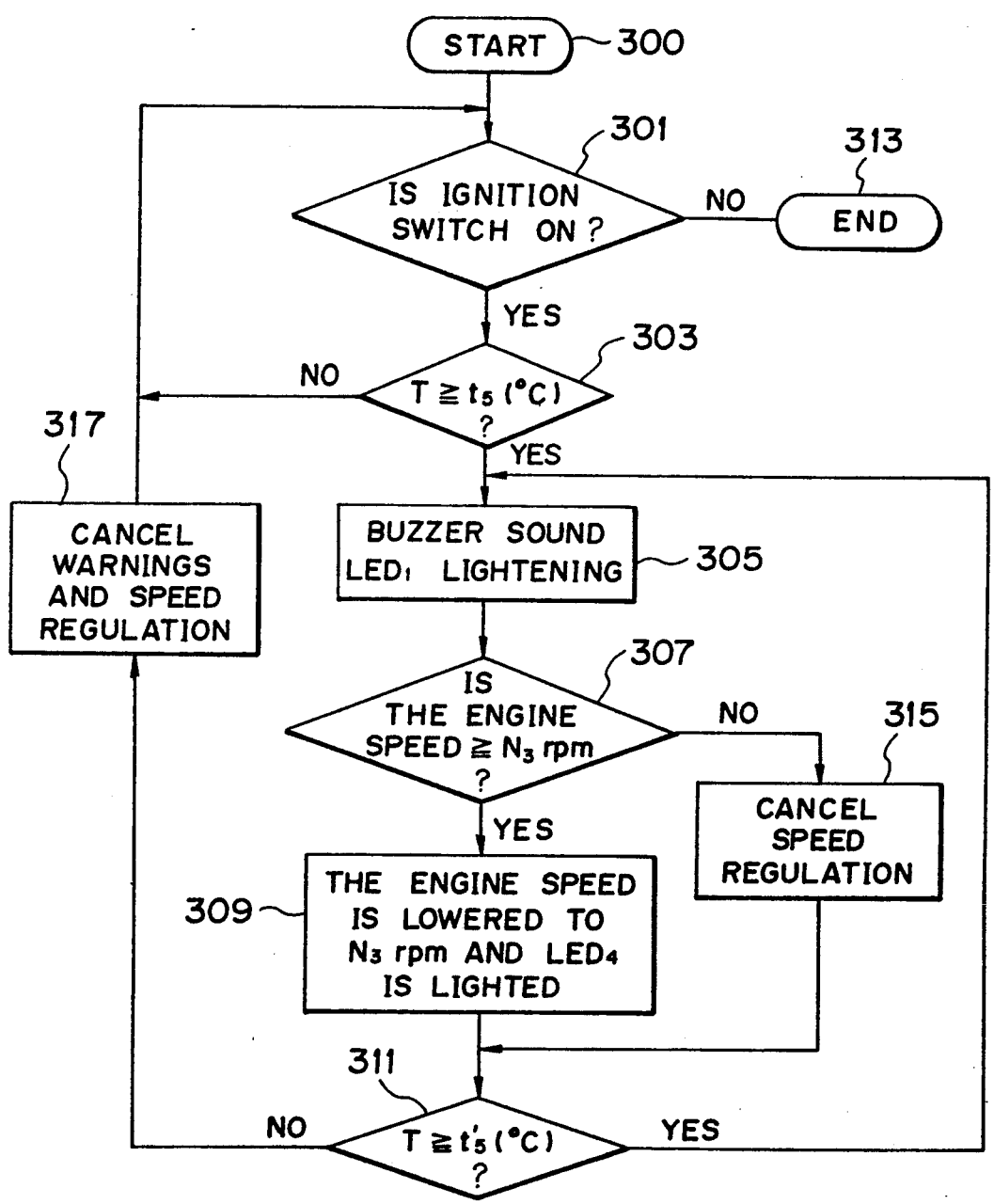
FIG. 12 is a flowchart showing another overheating detection operation executed by the FIG. 1 embodiment.

Next, another operation of overheat warning will be described with reference to FIGS. 9, 10 and 12.

The engine temperature sensor SE1 functioning as an engine overheat detecting sensor is also used for switching the starting spark advancing time which was previously described. The relation between temperature and resistance for the thermistor of sensor SE1 is shown in FIG. 9. Normal and abnormal rising characteristics of engine temperature are shown in FIG. 10.

First, if it is presumed that the engine is started in FIG. 10 and cooling water is not circulated to the cylinder by some abnormal causes at $T_E$ point after the start of the engine, the engine temperature begins to rise abruptly. Referring to FIG. 12, when the engine temperature T reaches $t_5$ at 303 (the resistance value of the thermistor in FIG. 9 is $R_5$ [Ω] at this time), the microcomputer circuit 52 judges that the cooling system of the engine is abnormal, and brings the A point of the interface circuit 60 of FIG. 1 to a low level from a high level, so that current flows in the following order; battery→ buzzer→ diode D11→ interface 60 and battery→ resistor $R_5$→ LED1→ interface 60, and the buzzer generates a sound and at the same time the LED1 is lighted to warn the operator about the overheating (step 305). Also, it is judged at 307 whether the engine speed is $N_3$ [rpm] or more at this time. If engine speed is less than $N_3$ at 307, it is judged at 311 whether the engine temperature T is greater than or equal to overheat warning canceling temperature $t'_5$ [°C.] (the thermistor resistance value from FIG. 9 is $R'_5$ [Ω] at this time). If T is greater than or equal to overheat warning canceling temperature $t'_5$ [°C.], the generation of the buzzer sound and the lighting of the LED1 are continued (305). On the other hand, if T is less than overheat warning canceling temperature $t'_5$ [°C.], the engine temperature has returned to a normal temperature, and microcomputer circuit 52 brings the A point of the interface circuit 60 back to a high level, so that the buzzer sound is stopped and the LED1 is turned off (317).

If the engine speed is $N_3$ [rpm] or more at 307, engine speed regulation (this cuts the sparking of the spark plug) is actuated at 309 to regulate the engine speed to $N_3$ [rpm] irrespective of the opening degree of the throttle and thereby prevent the rising of engine temperature. Also at 309, the LED4 is lighted to inform the operator that speed regulation is occurring. Therefore, the buzzer B1 generates a sound, and the LEDs 1 and 4 are lighted.

This speed regulation is canceled at 315 when the throttle is returned and/or the engine speed falls below $N_3$ [rpm]. Of course, whenever the engine temperature T falls below $t'_5$, the warnings and speed regulation are canceled at 317.

In this way, in this embodiment, the whole apparatus is operated as mentioned above. Accordingly, a single temperature sensor SE1 is used for controlling the starting spark advance and for detecting overheating, without affecting the total performance. As a result, the apparatus is simplified, the most suitable place can be selected for sensor SE1, detecting sensibility can be stabilized, wiring is simplified and the control circuit is simplified. As a result, the apparatus of the present invention offers a great advantage in respect of production cost. Also, maintenance for finding disorder or trouble becomes easier, and easy handling can be obtained. The conventional apparatus does not have the aforementioned advantages.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An engine ignition timing control apparatus, comprising:

a temperature sensor disposed on or in the vicinity of a cylinder head of an engine, warning means for issuing an operator perceptible warning when said temperature sensor detects an overheating state of the engine, and a main control portion responsive to output signals from said temperature sensor for regulating engine speed and driving said warning means in accordance with necessity; said main control portion including starting time ignition timing control means responsive to said output signals from said temperature sensor for controlling spark advancement according to a starting timing from starting of the engine until the occurrence of one of first and second events, and trolling time ignition timing control means responsive to said output signals from said temperature sensor for controlling spark advancement according to a trolling timing different from said starting timing subsequent to the occurrence of one of said first and second events, wherein said first event occurs upon expiration of a first time interval from starting of the engine, and said second event occurs when the engine temperature is in excess of a predetermined temperature before expiration of said first time interval and after expiration of a second time interval which is less than said first time interval.

2. A method for controlling the operating speed of an engine, comprising the steps of:

providing a temperature sensor at a sensor location adjacent a cylinder head of the engine;

calculating a rate of increase in engine temperature based on engine temperature information produced by said temperature sensor; and selectively regulating engine speed based on the calculated rate of increase in engine temperature.

3. A method according to claim 2, wherein said step of regulating engine speed includes the step of controlling ignition timing of the engine in response to said engine temperature information produced by said temperature sensor located at said sensor location adjacent the cylinder head of the engine.

4. A method according to claim 3, including the further step of regulating engine speed to a predetermined engine speed value whenever engine temperature exceeds a predetermined engine temperature value.

* * * * *